US007532451B2

(12) United States Patent
Krichtafovitch et al.

(10) Patent No.: US 7,532,451 B2

(45) **Date of Patent: *May 12, 2009**

(54) ELECTROSTATIC FLUID ACCLERATOR FOR AND A METHOD OF CONTROLLING FLUID FLOW

(75) Inventors: Igor A. Krichtafovitch, Kirkland, WA (US); Vladimir L. Gorobets, Redmond, WA (US)

(73) Assignee: Kronos Advanced Technologies, Inc., Belmont, MA (US)

( * ) Notice: Subject to any disclaimer, the term of this patent is extended or adjusted under 35 U.S.C. 154(b) by 205 days.

This patent is subject to a terminal disclaimer.

(21) Appl. No.: 11/437,828

(22) Filed: May 22, 2006

(65) Prior Publication Data

US 2007/0046219 A1 Mar. 1, 2007

Related U.S. Application Data

(63) Continuation of application No. 10/847,438, filed on May 18, 2004, now Pat. No. 7,053,565.

(51) Int. Cl.
*H01G 7/02* (2006.01)

(52) U.S. Cl. ...................................... 361/233; 361/225

(58) Field of Classification Search ................. 361/225, 361/230, 233

See application file for complete search history.

(56) References Cited

U.S. PATENT DOCUMENTS 1,345,790 A 7/1920 Lodge
1,687,011 A 10/1928 Fleischmann
1,695,075 A 12/1928 Zimmerman (Continued)

FOREIGN PATENT DOCUMENTS

DE 1158043 11/1963

(Continued)

OTHER PUBLICATIONS

Request for Ex Parte Reexamination under 37 C.F.R. 1.510; U.S. Appl. No. 90/007,276, filed on Oct. 29, 2004.

(Continued)

*Primary Examiner*—Stephen W Jackson
*Assistant Examiner*—Christopher J Clark
(74) *Attorney, Agent, or Firm*—Morrison & Foerster LLP

(57) ABSTRACT

An electrostatic fluid acceleration and method of operation thereof includes at least two synchronously powered stages with final or rear-most electrodes of one stage maintained at substantially the same instantaneous voltage as the immediately adjacent initial or forward-most electrodes of a next stage in an airflow direction. A single power supply or synchronized and phase controlled power supplies provide high voltage power to each of the stages such that both the phase and amplitude of the electric power applied to the corresponding electrodes are aligned in time. The frequency and phase control allows neighboring stages to be closely spaced at a distance of from 1 to 2 times an inter-electrode distance within a stage, and, in any case, minimizing or avoiding production of a back corona current from a corona discharge electrode of one stage to an electrode of a neighboring stage. Corona discharge electrodes of neighboring stages may be horizontally aligned, complementary collector electrodes of all stages being similarly horizontally aligned between and horizontally offset from the corona discharge electrodes.

57 Claims, 7 Drawing Sheets

U.S. PATENT DOCUMENTS

| | | | |
|---|---|---|---|
| 1,758,993 | A | 5/1930 | Wolff |
| 1,888,606 | A | 11/1932 | Nesbit |
| 1,934,923 | A | 11/1933 | Heinrich |
| 1,950,816 | A | 3/1934 | Richardson |
| 1,959,374 | A | 5/1934 | Lissman |
| 2,587,173 | A | 2/1952 | Landgraf |
| 2,590,447 | A | 3/1952 | Nord, Jr. et al. |
| 2,695,129 | A | 11/1954 | Stahmer |
| 2,765,975 | A | 10/1956 | Lindenblad |
| 2,768,246 | A | 10/1956 | Klein |
| 2,793,324 | A | 5/1957 | Halus et al. |
| 2,815,824 | A | 12/1957 | Armstrong et al. |
| 2,826,262 | A | 3/1958 | Byerly |
| 2,830,233 | A | 4/1958 | Halus et al. |
| 2,949,550 | A | 8/1960 | Brown |
| 2,950,387 | A | 8/1960 | Brubaker |
| 2,961,577 | A | 11/1960 | Thomas et al. |
| 2,996,144 | A | 8/1961 | Phyl |
| 3,026,964 | A | 3/1962 | Penney |
| 3,071,705 | A | 1/1963 | Coleman et al. |
| 3,108,394 | A | 10/1963 | Ellman et al. |
| 3,144,129 | A | 8/1964 | Weisberg |
| 3,198,726 | A | 8/1965 | Trikilis |
| 3,223,233 | A | 12/1965 | Becker et al. |
| 3,263,848 | A | 8/1966 | Zackheim |
| 3,267,860 | A | 8/1966 | Brown |
| 3,272,423 | A | 9/1966 | Bjarno |
| 3,339,721 | A | 9/1967 | Goldstein |
| 3,374,941 | A | 3/1968 | Okress |
| 3,436,960 | A | 4/1969 | Johnson |
| 3,443,358 | A | 5/1969 | Drenning et al. |
| 3,452,225 | A | 6/1969 | Gourdine |
| 3,518,462 | A | 6/1970 | Brown |
| 3,521,807 | A | 7/1970 | Weisberg |
| 3,582,694 | A | 6/1971 | Gourdine |
| 3,638,058 | A | 1/1972 | Fritzius |
| 3,640,381 | A | 2/1972 | Kanada et al. |
| 3,659,777 | A | 5/1972 | Kanada et al. |
| 3,660,968 | A | 5/1972 | Dyla et al. |
| 3,675,096 | A | 7/1972 | Kiess |
| 3,684,156 | A | 8/1972 | Fettinger et al. |
| 3,699,387 | A | 10/1972 | Edwards |
| 3,740,927 | A | 6/1973 | Vincent |
| 3,751,715 | A | 8/1973 | Edwards |
| 3,892,927 | A | 7/1975 | Lindenberg |
| 3,896,347 | A | 7/1975 | Gelfand |
| 3,907,520 | A | 9/1975 | Huang et al. |
| 3,918,939 | A | 11/1975 | Hardt |
| 3,935,397 | A | 1/1976 | West |
| 3,936,635 | A | 2/1976 | Clark |
| 3,981,695 | A | 9/1976 | Fuchs |
| 3,983,393 | A | 9/1976 | Thettu et al. |
| 3,984,215 | A | 10/1976 | Zucker |
| 3,990,463 | A | 11/1976 | Norman |
| 4,008,057 | A | 2/1977 | Gelfand et al. |
| 4,011,719 | A | 3/1977 | Banks |
| 4,061,961 | A | 12/1977 | Baker |
| 4,086,152 | A | 4/1978 | Rich et al. |
| 4,086,650 | A | 4/1978 | Davis et al. |
| 4,124,003 | A | 11/1978 | Abe et al. |
| 4,126,434 | A | 11/1978 | Keiichi |
| 4,136,162 | A | 1/1979 | Fuchs et al. |
| 4,136,659 | A | 1/1979 | Smith |
| 4,156,885 | A | 5/1979 | Baker et al. |
| 4,162,144 | A | 7/1979 | Cheney |
| 4,194,888 | A | 3/1980 | Schwab et al. |
| 4,210,847 | A | 7/1980 | Shannon et al. |
| 4,216,000 | A | 8/1980 | Kofoid |
| 4,231,766 | A | 11/1980 | Spurgin |
| 4,232,355 | A | 11/1980 | Finger et al. |
| 4,240,809 | A | 12/1980 | Elsbernd et al. |
| RE30,480 | E | 1/1981 | Gelfand |
| 4,246,010 | A | 1/1981 | Honacker |
| 4,259,707 | A | 3/1981 | Penney |
| 4,266,948 | A | 5/1981 | Teague et al. |
| 4,267,502 | A | 5/1981 | Reese et al. |
| 4,290,003 | A | 9/1981 | Lanese |
| 4,292,493 | A | 9/1981 | Sejander et al. |
| 4,306,120 | A | 12/1981 | Klein |
| 4,313,741 | A | 2/1982 | Masuda et al. |
| 4,315,837 | A | 2/1982 | Rourke et al. |
| 4,335,414 | A | 6/1982 | Weber |
| 4,351,648 | A | 9/1982 | Penny |
| 4,369,776 | A | 1/1983 | Roberts |
| 4,376,637 | A | 3/1983 | Yang |
| 4,379,129 | A | 4/1983 | Abe |
| 4,380,720 | A | 4/1983 | Fleck |
| 4,388,274 | A | 6/1983 | Rourke et al. |
| 4,390,831 | A | 6/1983 | Byrd et al. |
| 4,401,385 | A | 8/1983 | Katayama et al. |
| 4,428,500 | A | 1/1984 | Kohler |
| 4,448,789 | A | 5/1984 | Yang |
| 4,460,809 | A | 7/1984 | Bondar |
| 4,464,544 | A | 8/1984 | Klein |
| 4,477,268 | A | 10/1984 | Kalt |
| 4,481,017 | A | 11/1984 | Furlong |
| 4,482,788 | A | 11/1984 | Klein |
| 4,496,375 | A | 1/1985 | Le Vantine |
| 4,516,991 | A | 5/1985 | Kawashima |
| 4,567,541 | A | 1/1986 | Terai |
| 4,569,852 | A | 2/1986 | Yang |
| 4,574,326 | A | 3/1986 | Myochin et al. |
| 4,576,826 | A | 3/1986 | Liu et al. |
| 4,587,541 | A | 5/1986 | Dalman et al. |
| 4,600,411 | A | 7/1986 | Santamaria |
| 4,604,112 | A | 8/1986 | Ciliberti et al. |
| 4,613,789 | A | 9/1986 | Herden et al. |
| 4,632,135 | A | 12/1986 | Lenting et al. |
| 4,643,745 | A | 2/1987 | Sakakibara et al. |
| 4,646,196 | A | 2/1987 | Reale |
| 4,649,703 | A | 3/1987 | Dettling et al. |
| 4,673,416 | A | 6/1987 | Sakakibara et al. |
| 4,689,056 | A | 8/1987 | Noguchi et al. |
| 4,713,243 | A | 12/1987 | Schiraldi et al. |
| 4,713,724 | A | 12/1987 | Voelkel et al. |
| 4,719,535 | A | 1/1988 | Zhenjun et al. |
| 4,740,862 | A | 4/1988 | Halleck |
| 4,741,746 | A | 5/1988 | Chao et al. |
| 4,772,998 | A | 9/1988 | Guenther, Jr. et al. |
| RE32,767 | E | 10/1988 | Jonelis |
| 4,775,915 | A | 10/1988 | Walgrove, III |
| 4,783,595 | A | 11/1988 | Seidl |
| 4,789,801 | A | 12/1988 | Lee |
| 4,790,861 | A | 12/1988 | Watai et al. |
| 4,808,200 | A | 2/1989 | Dallhammer et al. |
| 4,811,159 | A | 3/1989 | Foster, Jr. |
| 4,812,711 | A | 3/1989 | Torok et al. |
| 4,815,784 | A | 3/1989 | Zheng |
| 4,837,658 | A | 6/1989 | Reale |
| 4,838,021 | A | 6/1989 | Beattie |
| 4,841,425 | A | 6/1989 | Maeba et al. |
| 4,849,246 | A | 7/1989 | Schmidt |
| 4,849,986 | A | 7/1989 | Boerner et al. |
| 4,853,719 | A | 8/1989 | Reale |
| 4,853,735 | A | 8/1989 | Kodama et al. |
| RE33,093 | E | 10/1989 | Schiraldi et al. |
| 4,878,149 | A | 10/1989 | Stiehl et al. |
| 4,924,937 | A | 5/1990 | Beal et al. |
| 4,925,670 | A | 5/1990 | Schmidt |
| 4,936,876 | A | 6/1990 | Reyes |
| 4,938,786 | A | 7/1990 | Tonomoto |
| 4,941,068 | A | 7/1990 | Hofmann et al. |
| 4,941,353 | A | 7/1990 | Fukatsu et al. |
| 4,980,611 | A | 12/1990 | Orenstein |

4,996,473 A 2/1991 Markson et al.
5,004,595 A 4/1991 Cherukuri et al.
5,006,761 A 4/1991 Torok et al.
5,012,159 A 4/1991 Torok et al.
5,021,249 A 6/1991 Bunick et al.
5,024,685 A 6/1991 Torok et al.
5,037,456 A 8/1991 Yu
5,055,118 A 10/1991 Nagoshi et al.
5,059,219 A 10/1991 Plaks et al.
5,072,746 A 12/1991 Kantor
5,076,820 A 12/1991 Gurvitz
5,077,500 A 12/1991 Torok et al.
5,087,943 A 2/1992 Creveling
5,136,461 A 8/1992 Zellweger
5,138,348 A 8/1992 Hosaka et al.
5,138,513 A 8/1992 Weinstein
5,155,524 A 10/1992 Oberhardt et al.
5,155,531 A 10/1992 Kurotori et al.
5,163,983 A 11/1992 Lee
5,165,799 A 11/1992 Wood
5,180,404 A 1/1993 Loreth et al.
5,199,257 A 4/1993 Colletta et al.
5,215,558 A 6/1993 Moon
5,245,692 A 9/1993 Kawai
5,257,073 A 10/1993 Gross et al.
5,269,131 A 12/1993 Brophy
5,284,659 A 2/1994 Cherukuri et al.
5,302,190 A 4/1994 Williams
5,330,559 A 7/1994 Cheney et al.
5,354,551 A 10/1994 Schmidt
5,368,839 A 11/1994 Aime et al.
5,369,953 A 12/1994 Brophy
5,423,902 A 6/1995 Strutz et al.
5,469,242 A 11/1995 Yu et al.
5,471,362 A 11/1995 Gowan
5,474,599 A 12/1995 Cheney et al.
5,484,472 A 1/1996 Weinberg
5,508,880 A 4/1996 Beyer
5,512,178 A 4/1996 Dempo
5,518,730 A 5/1996 Fuisz
5,535,089 A 7/1996 Ford et al.
5,542,967 A 8/1996 Ponizovsky et al.
5,556,448 A 9/1996 Cheney et al.
5,569,368 A 10/1996 Larsky et al.
5,578,112 A 11/1996 Krause
5,601,636 A 2/1997 Glucksman
5,603,971 A 2/1997 Porzio et al.
5,642,254 A * 6/1997 Benwood et al. ............ 361/235
5,656,063 A 8/1997 Hsu
5,661,299 A 8/1997 Purser
5,665,147 A 9/1997 Taylor et al.
5,667,564 A 9/1997 Weinberg
5,700,478 A 12/1997 Biegajski et al.
5,707,422 A 1/1998 Jacobsson et al.
5,707,428 A 1/1998 Feldman et al.
5,726,161 A 3/1998 Whistler
5,769,155 A 6/1998 Ohadi et al.
5,779,769 A 7/1998 Jiang
5,814,135 A 9/1998 Weinberg
5,827,407 A 10/1998 Wang et al.
5,847,917 A 12/1998 Suzuki
5,854,742 A 12/1998 Faulk
5,892,363 A 4/1999 Roman
5,894,001 A 4/1999 Hitzler et al.
5,897,897 A 4/1999 Porzio et al.
5,899,666 A 5/1999 Chung et al.
D411,001 S 6/1999 Pinchuk
5,920,474 A 7/1999 Johnson et al.
5,938,818 A 8/1999 Miller
5,939,091 A 8/1999 Eoga et al.
5,942,026 A 8/1999 Erlichman et al.
5,948,430 A 9/1999 Zerbe et al.
5,951,957 A 9/1999 Simpson
5,973,905 A 10/1999 Shaw
5,982,102 A 11/1999 Andzej
5,993,521 A 11/1999 Loreth et al.
6,007,682 A 12/1999 Hancock et al.
D420,438 S 2/2000 Pinchuk
6,023,155 A 2/2000 Kalinsky et al.
6,039,816 A 3/2000 Morita et al.
6,042,637 A 3/2000 Weinberg
6,056,808 A 5/2000 Krause
D427,300 S 6/2000 Pinchuk
6,084,350 A 7/2000 Ezaki et al.
6,108,504 A 8/2000 Dickhoff
6,125,636 A 10/2000 Taylor et al.
D433,494 S 11/2000 Pinchuk et al.
D434,483 S 11/2000 Pinchuk
6,145,298 A 11/2000 Burton
6,152,146 A 11/2000 Taylor et al.
6,163,098 A 12/2000 Taylor et al.
6,167,196 A 12/2000 Huggins et al.
6,174,514 B1 1/2001 Cherukuri et al.
6,176,977 B1 1/2001 Taylor et al.
6,177,096 B1 1/2001 Zerbe et al.
6,182,671 B1 2/2001 Taylor et al.
6,187,351 B1 2/2001 Porzio et al.
D438,513 S 3/2001 Pinchuk
6,195,827 B1 3/2001 Dumitriu
6,200,539 B1 3/2001 Sherman et al.
6,203,600 B1 3/2001 Loreth
D440,290 S 4/2001 Plnchuk
6,210,642 B1 4/2001 Lee et al.
6,215,248 B1 4/2001 Noll
6,221,402 B1 4/2001 Itoh et al.
6,224,653 B1 5/2001 Shvedchikov et al.
6,228,330 B1 5/2001 Herrmann et al.
6,231,957 B1 5/2001 Zerbe et al.
6,238,690 B1 5/2001 Kiefer et al.
6,245,126 B1 6/2001 Feldman et al.
6,245,132 B1 6/2001 Feldman et al.
6,270,733 B1 8/2001 Rodden
6,312,507 B1 11/2001 Taylor et al.
6,313,064 B1 11/2001 Miyafuji et al.
6,350,417 B1 2/2002 Lau et al.
6,351,541 B1 2/2002 Zinserling
6,365,215 B1 4/2002 Grainger et al.
6,375,714 B1 4/2002 Rump et al.
6,375,963 B1 4/2002 Repka et al.
6,394,086 B1 5/2002 Barnes et al.
6,404,089 B1 6/2002 Tomion
6,419,903 B1 7/2002 Xu et al.
6,444,240 B1 9/2002 Barkalow et al.
6,469,296 B1 * 10/2002 Hansen et al. .............. 250/287
6,497,899 B2 12/2002 Thombre et al.
6,504,308 B1 1/2003 Krichtafovitch et al.
6,517,865 B2 2/2003 Cade et al.
6,534,042 B2 3/2003 Delli Santi et al.
6,574,123 B2 6/2003 Wiser et al.
6,603,268 B2 8/2003 Lee
6,603,795 B2 8/2003 Ma et al.
6,664,741 B1 * 12/2003 Krichtafovitch ....... 315/111.91
6,709,484 B2 3/2004 Lau et al.
6,713,026 B2 3/2004 Taylor et al.
6,727,657 B2 4/2004 Krichtafovitch et al.
6,749,667 B2 6/2004 Reeves et al.
6,872,941 B1 * 3/2005 Whitehouse et al. ........ 250/288
6,888,314 B2 * 5/2005 Krichtafovitch et al. ..................... 315/111.91
6,919,698 B2 7/2005 Krichtafovitch
6,937,455 B2 8/2005 Krichtafovitch et al.
6,963,479 B2 11/2005 Krichtafovitch
7,122,070 B1 10/2006 Krichtafovitch
7,150,780 B2 12/2006 Krichtafovitch
7,157,704 B2 1/2007 Krichtafovitch et al.
7,248,003 B2 7/2007 Krichtafovitch

| | | | |
|---|---|---|---|
| 7,262,564 | B2 | 8/2007 | Krichtafovitch et al. |
| 7,311,756 | B2 * | 12/2007 | Ashworth ...................... 95/70 |
| 7,410,532 | B2 | 8/2008 | Krichtafovitch et al. |
| 2001/0004046 | A1 | 6/2001 | Taylor et al. |
| 2001/0022964 | A1 | 9/2001 | Leung et al. |
| 2001/0032544 | A1 | 10/2001 | Taylor et al. |
| 2001/0048906 | A1 | 12/2001 | Lau et al. |
| 2002/0079212 | A1 | 6/2002 | Taylor et al. |
| 2002/0098131 | A1 | 7/2002 | Taylor et al. |
| 2002/0115301 | A1 * | 8/2002 | Savas ......................... 438/710 |
| 2002/0122751 | A1 | 9/2002 | Sinaiko et al. |
| 2002/0122752 | A1 | 9/2002 | Taylor et al. |
| 2002/0127156 | A1 | 9/2002 | Taylor |
| 2002/0127190 | A1 | 9/2002 | Zerbe et al. |
| 2002/0131990 | A1 | 9/2002 | Barkalow et al. |
| 2002/0141914 | A1 | 10/2002 | Lau et al. |
| 2002/0150544 | A1 | 10/2002 | Zerbe et al. |
| 2002/0155041 | A1 | 10/2002 | McKinney, Jr. et al. |
| 2003/0008008 | A1 | 1/2003 | Leung et al. |
| 2003/0033176 | A1 | 2/2003 | Hancock |
| 2003/0035841 | A1 | 2/2003 | Dzija et al. |
| 2003/0053962 | A1 | 3/2003 | Zerbe et al. |
| 2003/0147785 | A1 | 8/2003 | Joannou |
| 2003/0165410 | A1 | 9/2003 | Taylor |
| 2003/0170150 | A1 | 9/2003 | Lau et al. |
| 2003/0206837 | A1 | 11/2003 | Taylor et al. |
| 2003/0206839 | A1 | 11/2003 | Taylor et al. |
| 2003/0206840 | A1 | 11/2003 | Taylor et al. |
| 2003/0209420 | A1 | 11/2003 | Taylor et al. |
| 2003/0234618 | A1 | 12/2003 | Krichtafovitch |
| 2004/0004440 | A1 | 1/2004 | Krichtafovitch et al. |
| 2004/0004797 | A1 | 1/2004 | Krichtafovitch et al. |
| 2004/0025497 | A1 | 2/2004 | Truce |
| 2004/0033340 | A1 | 2/2004 | Lau et al. |
| 2004/0047775 | A1 | 3/2004 | Lau et al. |
| 2004/0052700 | A1 | 3/2004 | Kotlyar et al. |
| 2004/0057882 | A1 | 3/2004 | Lau et al. |
| 2004/0079233 | A1 | 4/2004 | Lau et al. |
| 2004/0110458 | A1 | 6/2004 | Kato et al. |
| 2004/0211675 | A1 | 10/2004 | Dong et al. |
| 2004/0212329 | A1 | 10/2004 | Krichtafovitch et al. |
| 2004/0217720 | A1 | 11/2004 | Krichtafovitch et al. |
| 2005/0150384 | A1 | 7/2005 | Krichtafovitch et al. |
| 2005/0151490 | A1 | 7/2005 | Krichtafovitch |
| 2005/0200289 | A1 | 9/2005 | Krichtafovitch et al. |
| 2005/0211415 | A1 | 9/2005 | Arts et al. |
| 2006/0055343 | A1 | 3/2006 | Krichtafovitch et al. |
| 2006/0108286 | A1 | 5/2006 | Hambitzer et al. |
| 2006/0112955 | A1 | 6/2006 | Reaves |
| 2006/0177356 | A1 | 8/2006 | Miller |
| 2006/0182672 | A1 | 8/2006 | Hallam |
| 2006/0226787 | A1 | 10/2006 | Krichtafovitch et al. |
| 2007/0247077 | A1 | 10/2007 | Krichtafovitch |
| 2008/0030920 | A1 | 2/2008 | Krichtafovitch et al. |

FOREIGN PATENT DOCUMENTS

| | | |
|---|---|---|
| DE | 4032974 | 5/1991 |
| GB | 926128 | 5/1963 |
| JP | 60-114363 | 6/1985 |
| JP | 63-143954 | 6/1988 |
| WO | WO-94/25170 | 11/1994 |
| WO | WO-2006/046179 | 5/2006 |
| WO | WO-2006/107390 | 10/2006 |

OTHER PUBLICATIONS

Humpries, Stanley, “Principles of Charged Particle Accleration”, Department of Electrical and Engineering, University of New Mexico, 1999 Download from: <http://www.fieldp.com/cpa/cpa.html>; See, e.g. chapter 9 (attached).

Chen, Junhong, “Direct-Current Corona Enhanced Chemical Reactions” Thesis, University of Minnesota, USA, Aug. 2002 Download from: <http://www.menet.umn.edu/jhchen/Junhong_dissertation_final.pdf>.

Request for Ex Parte Reexamination under 37 C.F.R. 1.510: U.S. Appl. No. 90/007,276, filed on Oct. 29, 2004.

Manual on Current Mode PWM Controller, LinFinity Microelectronics (SG1842/SG1843 Series, Apr. 2000) Product Catalog of GE-Ding Information Inc. (From Website—www.redsensor.com.tw).

Product Catalog of GE-Ding Information Inc. (From website—www.reedsensor.com.tw).

* cited by examiner

ELECTROSTATIC FLUID ACCLERATOR FOR AND A METHOD OF CONTROLLING FLUID FLOW

RELATED APPLICATIONS

This application is a continuation of Ser. No. 10/847,438 filed May 18, 2004, entitled An Electrostatic Fluid Accelerator For And A Method Of Controlling Fluid Flow, which is a continuation-in-part of U.S. patent application Ser. No. 10/188,069 filed Jul. 3, 2002 and entitled Electrostatic Fluid Accelerator For And A Method Of Controlling Fluid Flow and the continuation thereof, U.S. patent application Ser. No. 10/806,473 filed Mar. 23, 2004 of the same title, and is related to and U.S. patent application Ser. No. 09/419,720 filed Oct. 14, 1999 and entitled Electrostatic Fluid Accelerator, now U.S. Pat. No. 6,504,308, U.S. patent application Ser. No. 10/175,947 filed Jun. 21, 2002 and entitled Method of and Apparatus for Electrostatic Fluid Acceleration Control of a Fluid Flow, now U.S. Pat. No. 6,664,741; U.S. patent application Ser. No. 10/187,983 filed Jul. 3, 2002 and entitled Spark Management Method And Device; U.S. patent application Ser. No. 10/295,869 filed Nov. 18, 2002 and entitled Electrostatic Fluid Accelerator which is a continuation of U.S. provisional application Ser. No. 60/104,573, filed on Oct. 16, 1998; U.S. patent application Ser. No. 10/724,707 filed Dec. 2, 2003 and entitled Corona Discharge Electrode and Method of Operating Same; U.S. patent application Ser. No. 10/735,302 filed Dec. 15, 2003 and entitled Method of and Apparatus for Electrostatic Fluid Acceleration Control of a Fluid; and U.S. patent application Ser. No. 10/752,530 filed Jan. 8, 2004 and entitled Electrostatic Air Cleaning Device, all of which are incorporated herein in their entireties by reference.

BACKGROUND OF THE INVENTION

1. Field of the Invention

The invention relates to a device for and method of accelerating, and thereby imparting velocity and momentum to a fluid, and particularly to the use of corona discharge technology to generate ions and electrical fields especially through the use of ions and electrical fields for the movement and control of fluids such as air.

2. Description of the Related Art

A number of patents (see, e.g., U.S. Pat. No. 4,210,847 by Shannon, et al. and U.S. Pat. No. 4,231,766 by Spurgin) describe ion generation using an electrode (termed the “corona electrode”), attracting and, therefore, accelerating the ions toward another electrode (termed the “collecting” and/or “attracting” electrode), thereby imparting momentum to the ions in a direction toward the attracting electrode. Collisions between the ions and the fluid, such as surrounding air molecules, transfer the momentum of the ions to the fluid inducing a corresponding movement of the fluid.

U.S. Pat. No. 4,789,801 of Lee, U.S. Pat. No. 5,667,564 of Weinberg, U.S. Pat. No. 6,176,977 of Taylor, et al., and U.S. Pat. No. 4,643,745 of Sakakibara, et al. also describe air movement devices that accelerate air using an electrostatic field. Air velocity achieved in these devices is very low and is not practical for commercial or industrial applications.

U.S. Pat. Nos. 3,699,387 and 3,751,715 of Edwards describe the use of multiple stages of Electrostatic Air Accelerators (EFA) placed in succession to enhance air flow. These devices use a conductive mesh as an attracting (collecting) electrode, the mesh separating neighboring corona electrodes. The mesh presents a significant air resistance and impairs air flow thereby preventing the EFA from attaining desirable higher flow rates.

Unfortunately, none of these devices are able to produce a commercially viable amount of the airflow. Providing multiple stages of conventional air movement devices cannot, in and of itself, provide a solution. For example, five serial stages of electrostatic fluid accelerators placed in succession deliver only a 17% greater airflow than one stage alone. See, for example, U.S. Pat. No. 4,231,766 of Spurgin.

Accordingly, a need exists for a practical electrostatic fluid accelerator capable of producing commercially useful flow rates.

SUMMARY OF THE INVENTION

The invention addresses several deficiencies in the prior art limitations on air flow and general inability to attain theoretical optimal performance. One of these deficiencies includes excessive size requirements for multi-stage EFA devices since several stages of EFA, placed in succession, require substantial length along an air duct (i.e., along air flow direction). This lengthy duct further presents greater resistance to air flow.

Still other problems arise when stages are placed close to each. Reduced spacing between stages may produce a “back corona” between an attractor electrode of one stage and a corona discharge electrode of an adjacent next stage that results in a reversed air flow. This may happen due to the large electrical potential difference between the corona electrode of the next stage and the collecting (attracting) electrode of the previous (upwind) stage. Moreover, due to the electrical capacitance between the neighboring stages, there is a parasitic current flow between neighboring stages. This current is caused by non-synchronous high voltage ripples or high voltage pulses between neighboring stages.

Still another problem develops using large or multiple stages so that each separate (or groups of) stage(s) is provided with its own high voltage power supply (HVPS). In this case, the high voltage required to create the corona discharge may lead to an unacceptable level of sparks being generated between the electrodes. When a spark is generated, the HVPS must completely shut down for some period of time required for deionization and spark quenching prior to resuming operation. As the number of electrodes increases, sparks are generated more frequently than with one set of electrodes. If one HVPS feeds several sets of electrodes (i.e., several stages) then it will be necessary to shut down more frequently to extinguish the increased number of sparks generated. That leads to an undesirable increase in power interruption for the system as a whole. To address this problem, it may be beneficial to feed each stage from its own dedicated HVPS. However, using separate HVPS requires that consecutive stages be more widely spaced to avoid undesirable electrical interactions caused by stray capacitance between the electrodes of neighboring stages and to avoid production of a back corona.

The present invention represents an innovative solution to increase airflow by closely spacing EFA stages while minimizing or avoiding the introduction of undesired effects. The invention implements a combination of electrode geometry, mutual location and the electric voltage applied to the electrodes to provide enhanced performance.

According to an embodiment of the invention, a plurality of corona electrodes and collecting electrodes are positioned parallel to each other or extending between respective planes perpendicular to an airflow direction. All the electrodes of neighboring stages are parallel to each other, with all the electrodes of the same kind (i.e., corona discharge electrodes or collecting electrodes) placed in the same parallel planes that are orthogonal to the planes where electrodes of the same kind or electrodes edges are located. According to another feature, stages are closely spaced to avoid or minimize any corona discharge between the electrodes of neighboring stages. If the closest spacing between adjacent electrodes is "a", the ratio of potential differences (V1−V2) between a voltage V1 applied to the first electrode and a voltage V2 applied to the closest second electrode, and the distance between the electrodes is a normalized distance "aN", then aN=(V1−V2)/a. The normalized distance between the corona discharge wire of one stage to the closest part of the neighboring stage should exceed the corona onset voltage applied between these electrodes, which, in practice, means that it should be no less than 1.2 to 2.0 times of the normalized distance from the corona discharge to the corresponding associated (i.e., nearest) attracting electrode(s) in order to prevent creation of a back corona.

Finally, voltages applied to neighboring stages should be synchronized and syn-phased. That is, a.c. components of the voltages applied to the electrodes of neighboring stages should rise and fall simultaneously and have substantially the same waveform and magnitude and/or amplitude.

The present invention increases EFA electrode density (typically measured in stages-per-unit-length) and eliminates or significantly decreases stray currents between the electrodes. At the same time, the invention eliminates corona discharge between electrodes of neighboring stages (e.g., back corona). This is accomplished, in part, by powering neighboring EFA stages with substantially the same voltage waveform, i.e., the potentials on the neighboring electrodes have the same or very similar alternating components so as to eliminate or reduce any a.c. differential voltage between stages and minimize an instantaneous voltage differential between immediately adjacent electrodes of adjacent stages. Operating in such a synchronous manner between stages, electrical potential differences between neighboring electrodes of adjacent EFA components remains constant and any resultant stray current from one electrode to another is minimized or completely avoided. Synchronization may be implemented by different means, but most easily by powering neighboring EFA components with respective synchronous and syn-phased voltages from corresponding power supplies, or with power supplies synchronized to provide similar amplitude a.c. components of the respective applied voltages. This may be achieved with the same power supply connected to neighboring EFA components or with different, preferably matched power supplies that produce synchronous and syn-phased a.c. component of the applied voltage. A further increase in the density of the electrodes (i.e., "electrode density") may be achieved by placing neighboring (i.e., immediately adjacent) stages with opposite polarity of the corona and collecting electrodes, i.e. the closest to each other electrodes of the neighboring stages having the same or similar (i.e., "close") electrical potentials.

DESCRIPTION OF THE PREFERRED EMBODIMENT

Figure 1B:
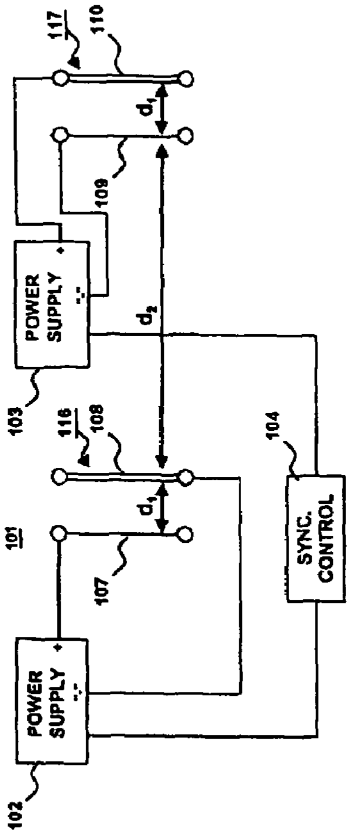
FIG. 1B is a schematic diagram of an EFA assembly with a pair of synchronized power supplies feeding respective adjacent corona discharge stages.
Figure 1A:
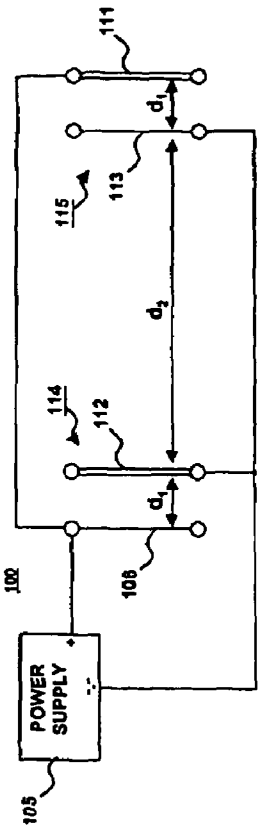
FIG. 1A is a schematic diagram of an Electrostatic Fluid Accelerator (EFA) assembly with a single high voltage power supply feeding adjacent corona discharge stages.

FIG. 1A is a schematic diagram of an Electrostatic Fluid Accelerator (EFA) device 100 comprising two EFA stages 114 and 115. First EFA stage 114 includes corona discharge electrode 106 and associated accelerating electrode 112; second EFA stage 115 includes corona discharge electrode 113 and associated accelerating electrode 111. Both EFA stages and all the electrodes are shown schematically. Only one set of corona discharge and collecting electrodes are shown per stage for ease of illustration, although it is expected that each stage may include a large number of arrayed pairs of corona and accelerating electrodes. An important feature of EFA 100 is that the distance $d_1$ between the corona discharge electrode 106 and collector electrode 112 is comparable to the distance $d_2$ between collector electrode 112 and the corona discharge electrode 113 of the subsequent stage 115, i.e., the closest distance between elements of adjacent stages is not much greater than the distance between electrodes within the same stage. Typically, the inter-stage distance $d_2$ between collector electrode 112 and corona discharge electrode 113 of the adjacent stage should be between 1.2 and 2.0 times that of the intra-stage spacing distance $d_1$ between corona discharge electrode 106 and collector electrode 112 (or spacing between corona discharge electrode 113, and collector electrode 111) within the same stage. Because of this consistent spacing, capacitance between electrodes 106 and 112 and between 106 and 113 are of the same order. Note that, in this arrangement, the capacitance coupling between corona discharge electrodes 106 and 113 may allow some parasitic current to flow between the electrodes. This parasitic current is of the same order of amplitude as a capacitive current between electrode pair 106 and 112. To decrease unnecessary current between electrodes 113 and 106, each should be supplied with synchronized high voltage waveforms. In the embodiment depicted in FIG. 1A both EFA stages are powered by a common power supply 105 i.e., a power supply having a single voltage conversion circuit or "converter"

(e.g., power transformer, rectifier, and filtering circuits, etc.) feeding both stages in parallel. This ensures that the voltage difference between electrodes 106 and 113 is maintained constant relative to electrodes 106 and 111 so that no or only a very small current flows between electrodes 106 and 113.

FIG. 1B shows an alternate configuration of an EFA 101 including a pair of EFA stages 116 and 117 powered by separate converters in the form of power supplies 102 and 103, respectively. First EFA stage 116 includes corona discharge electrode 107 and collecting electrode 108 forming a pair of complementary electrodes within stage 116. Second EFA stage 117 includes corona discharge electrode 109 and collecting electrode 110 forming a second pair of complementary electrodes. Both EFA stages 116, 117 and all electrodes 107-110 are shown schematically.

First EFA stage 116 is powered by power supply 102 and second EFA stage 117 is powered by power supply 103. Both EFA stages as well as both power supplies 102 and 103 may be of the same design to simplify synchronization, although different designs may be used as appropriate to accommodate alternative arrangements. Power supplies 102 and 103 are synchronized by the control circuitry 104 to provide synchronized power outputs. Control circuitry ensures that both power supplies 102 and 103 generate synchronized and syn-phased output voltages that are substantially equal such that the potential difference between the electrodes 107 and 109 is maintained substantially constant (e.g., has no or very small a.c. voltage component). (Note: While the term "synchronized" generally includes both frequency and phase coincidence between signals, the phase-alignment requirement is further emphasized by use of the term "syn-phase" requiring that the signals be in-phase with each other at the relevant locations, e.g., as applied to and as present at each stage.) Maintaining this potential difference constant (i.e., minimizing or eliminating any a.c. voltage component) limits or eliminates any capacitive current flow between electrodes 107 and 109 to an acceptable value, e.g., typically less than 1 mA and preferably less than 100 μA.

Figure 2B:
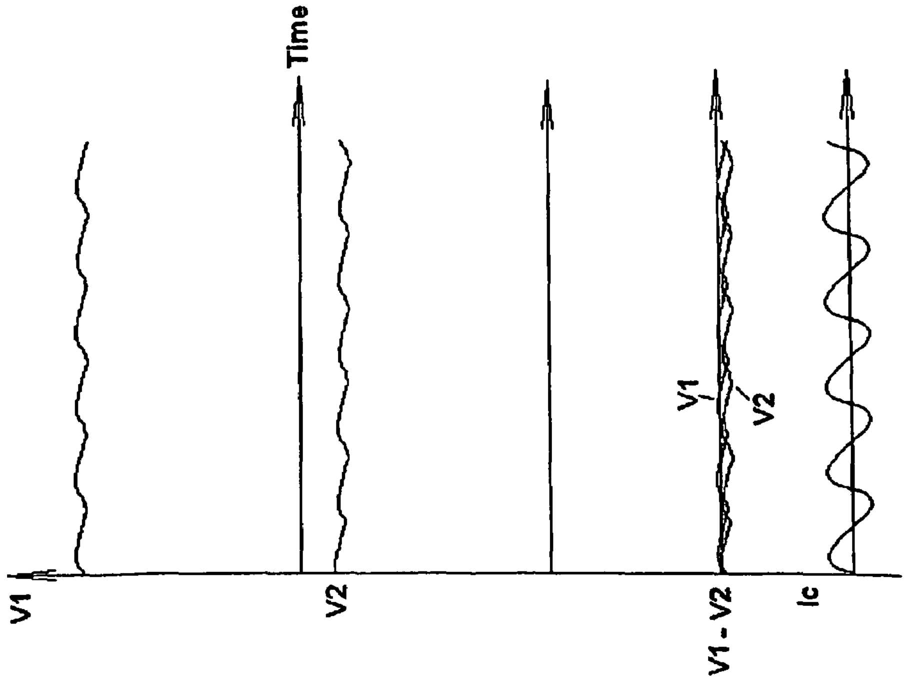
FIG. 2B is a timing diagram of voltages and currents between electrodes of neighboring EFA stages where a small voltage ripple exists between stages.
Figure 2A:
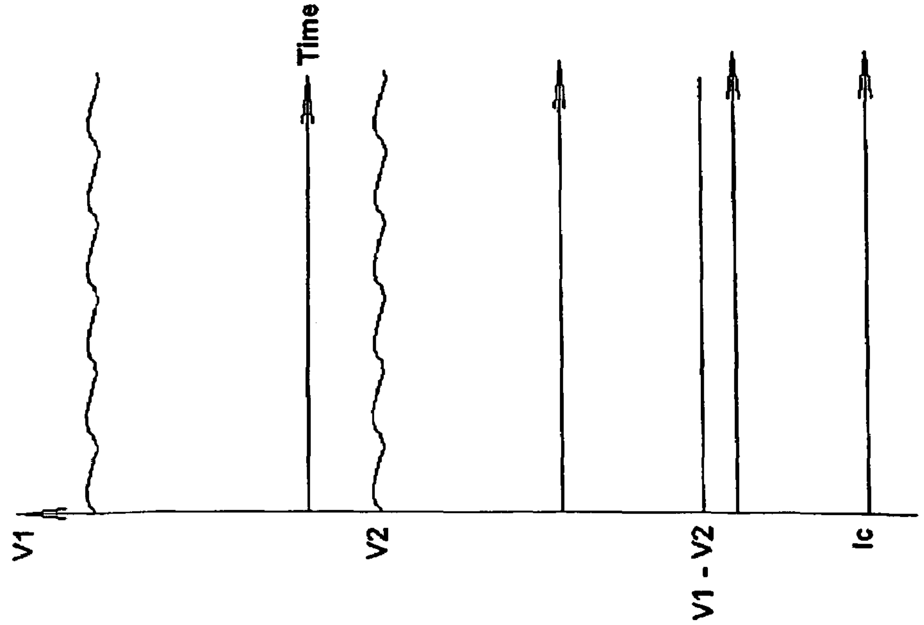
FIG. 2A is a timing diagram of voltages and currents between electrodes of neighboring EPA stages with no a.c. differential voltage component between the stages.

The reduction of parasitic capacitive current between electrodes of adjacent EPA stages can be seen with reference to the waveforms depicted in FIGS. 2A and 2B. As seen in the FIG. 2A, voltage V1 present on electrode 107 (FIG. 1B) and voltage V2 present on electrode 109 are synchronized and syn-phased, but not necessarily equal d.c. amplitude. Because of complete synchronization, the difference V1−V2 between the voltages present on electrodes 107 and 109 is near constant representing only a d.c. offset value between the signals (i.e., no a.c. component). A current Ic flowing through the capacitive coupling between electrode 107 and electrode 109 is proportioned to the time rate of change (dV/dt) of the voltage across this capacitance:

$$I_c=C^*[d(V1-V2)/dt].$$

It directly follows from this relationship that, if the voltage across any capacitance is held constant (i.e., has no a.c. component), no current flows the path. On the other hand, even small voltage changes may create large capacitive current flows if the voltage changes quickly (i.e., large d(V1−V2)/dt). In order to avoid excessive current flowing from the different electrodes of the neighboring EFA stages, voltages applied to the electrodes of these neighboring stages should be synchronized and syn-phased. For example, with reference to FIG. 2B, corona voltage V1 and V2 are slightly out of synchronization resulting in a small a.c. voltage component in the difference, d(V1−V2)/dt. This small a.c. voltage component results in a significant parasitic current Ic flowing between adjacent EFA stages. An embodiment of the present invention includes synchronization of power applied to all stages to avoid current flow between stages.

The closest spacing of electrodes of adjacent EFA stages may be approximated as follows. Note that a typical EFA operates efficiently over a rather narrow voltage range. The voltage $V_c$ applied between the corona discharge and collecting electrodes of the same stage should exceed the so called corona onset voltage $V_{onset}$ for proper operation. That is, when voltage $V_c$ is less than $V_{onset}$, no corona discharge occurs and no air movement is generated. At the same time $V_c$ should not exceed the dielectric breakdown voltage $V_b$ so as to avoid arcing. Depending on electrodes geometry and other conditions, $V_b$ may be more than twice as much as $V_{onset}$. For typical electrode configurations, the $V_b/V_{onset}$ ratio is about 1.4-1.8 such that any particular corona discharge electrode should not be situated at a distance from a neighboring collecting electrode where it may generate a "back corona." Therefore, the normalized distance aNn between closest electrodes of neighboring stages should be at least 1.2 times greater than the normalized distance "aNc" between the corona discharge and the collecting electrodes of the same stage and preferably not more than 2 times greater than distance "aNc." That is, electrodes of neighboring stages should be spaced so as to ensure that a voltage difference between the electrodes is less than the corona onset voltage between any electrodes of the neighboring stages.

If the above stated conditions are not satisfied, a necessary consequence is that neighboring stages must be further and more widely spaced from each other than otherwise. Such increased spacing between stages results in several conditions adversely affecting air movement. For example, increased spacing between neighboring stages leads to a longer duct and, consequently, to greater resistance to airflow. The overall size and weight of the EFA is also increased. With synchronized and syn-phased HVPSs, these negative aspects are avoided by allowing for reduced spacing between HFA stages without reducing efficiency or increasing spark generation.

Figure 3:
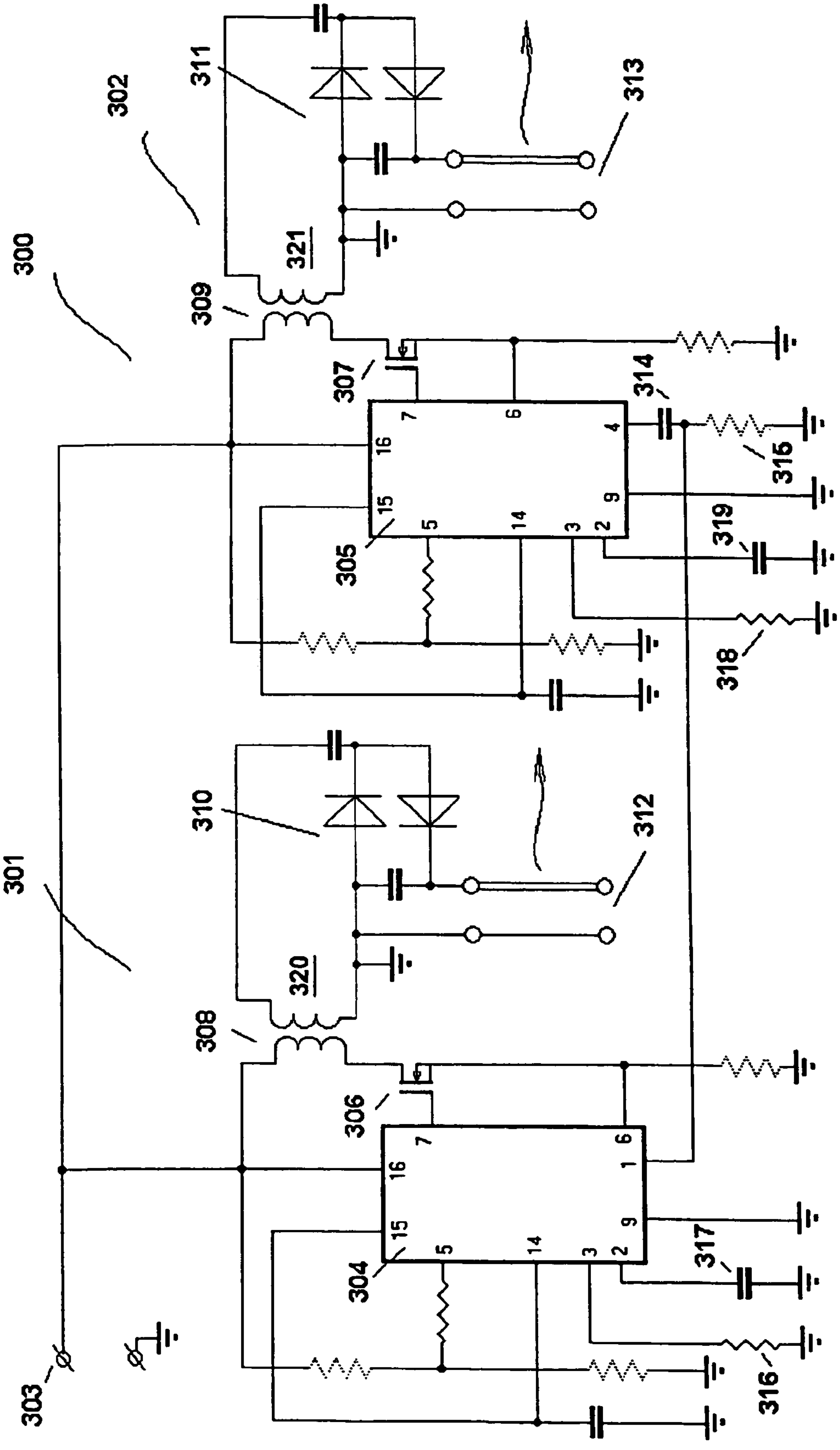
FIG. 3 is a schematic diagram of a power supply unit including a pair of high voltage power supply subassemblies having synchronized output voltages.

Referring to FIG. 3, a two stage EFA 300 includes a pair of converters in the form of HVPSs 301 and 302 associated with respective first and second stages 312 and 313. Both stages are substantially identical and are supplied with electrical power by identical HVPSs 301 and 302. HVPSs 301 and 302 include respective pulse width modulation (PWM) controllers 304 and 305, power transistors 306 and 307, high voltage inductors 308 and 309 (i.e., transformers or filtering chokes) and voltage doublers 320 and 321, each voltage doubler including rectifier circuits 310 and 311. HVPSs 301 and 302 provide power to respective EFA corona discharge electrodes of stages 312 and 313. As before, although EFA electrodes of stages 312 and 313 are diagrammatically depicted as single pairs of one corona discharge electrode and one accelerator (or attractor) electrode, each stage would typically include multiple pairs of electrodes configured in a two-dimensional array. PWM controllers 304, 305 generate (and provide at pin 7) high frequency pulses to the gates of respective power transistors 306 and 307. The frequency of these pulses is determined by respective RC timing circuits including resistor 316 and capacitor 317, and resistor 318 and the capacitor 319. Ordinarily, slight differences between values of these components between stages results in slightly different operating frequencies of the two HVPS stages which typically supply an output voltage within a range of 50 Hz to 1000 kHz. However, even a slight variation in frequency leads to non-synchronous operation of stages 312 and 313 of EFA 300. Thus, to ensure the synchronous and syn-phased (i.e., zero phase shift or difference) operation of power supplies 301 and 302, controller 305 is connected to receive a synchronization signal pulse from pin 1 of the PWM controller 304 via a synchronization input circuit including resistor 315 and capacitor 314. This arrangement synchronizes PWM controller 305 to PWM controller 304 so that both PWM controllers output voltage pulses that are both synchronous (same frequency) and syn-phased (same phase).

Figure 4B:
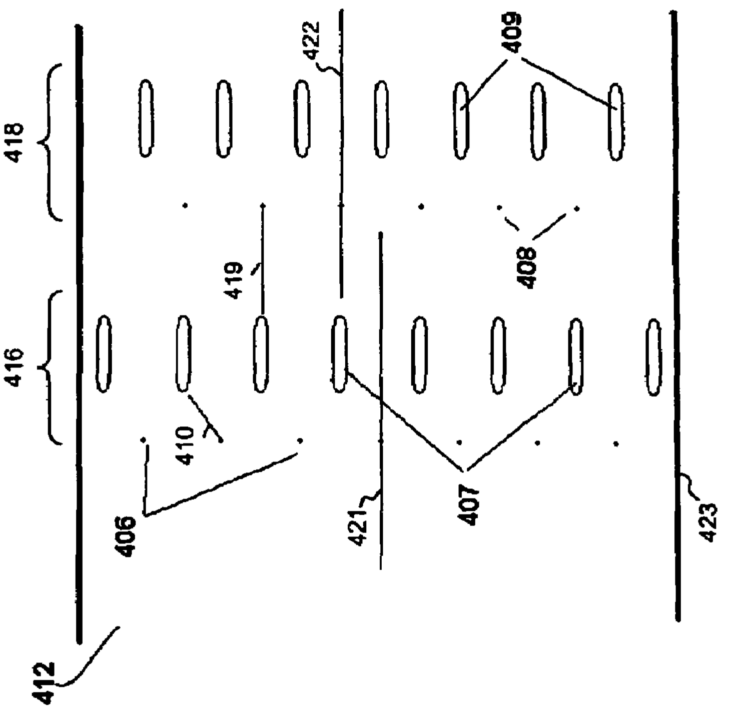
FIG. 4B is a schematic top view of a two stage EFA assembly implementing a second electrode placement geometry.
Figure 4A:
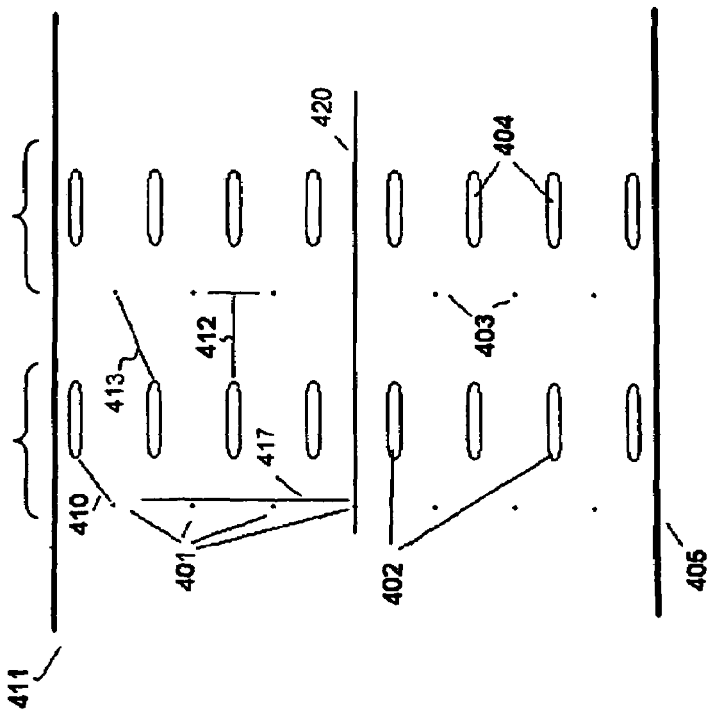
FIG. 4A is a schematic top view of a two stage EFA assembly implementing a first electrode placement geometry.

FIGS. 4A and 4B are cross-sectional views of two different arrangements of two-stage EFA devices. Although only two stages are illustrated, the principles and structure detailed is equally. With reference to FIG. 4A, first EFA device 411 consists of two serial or tandem stages 414 and 415. First stage 414 contains a plurality of parallel corona discharge electrodes 401 aligned in a first vertical column and collecting electrodes 402 aligned in a second column parallel to the column of corona discharge electrodes 401. All the electrodes are shown in cross-section longitudinally extending in to and out from the page. Corona discharge electrodes 401 may be in the form of conductive wires as illustrated, although other configurations may be used. Collecting electrodes 402 are shown horizontally elongate as conductive bars. Again, this is for purposes of illustration; other geometries and configurations may be implemented consistent with various embodiments of the invention. Second stage 415 similarly contains a column of aligned corona discharge electrodes 403 (also shown as thin conductive wires extending perpendicular to the page) and collecting electrodes 404 (again as bars). All the electrodes are mounted within air duct 405. First and second stages 414 and 415 of EFA 411 are powered by respective separate HVPSs (not shown). The HVPSs are synchronized and syn-phased so the corona discharge electrodes 403 of second stage 415 may be placed at the closest possible normalized distance to collecting electrodes 402 of first stage 414 without adversely interacting and degrading EPA performance.

For the purposes of illustration, we assume that all voltages and components thereof (e.g., a.c. and d.c.) applied to the electrodes of neighboring stages 414 and 415 are equal. It is further assumed that high voltages are applied to the corona discharge electrodes 401 and 403 and that the collecting electrodes 402 and 404 are grounded, i.e., maintained at common ground potential relative to the high voltages applied to corona discharge electrodes 401 and 403. All electrodes are arranged in parallel vertical columns with corresponding electrodes of different stages horizontally aligned and vertically offset from the complementary electrode of its own stage in staggered columns. A normalized distance 410 between corona discharge electrodes 401 and the leading edges of the closest vertically adjacent collecting electrodes 402 is equal to aN1. Normalized distance aN2 (413) between corona electrodes 403 of the second stage and the trailing edges of collecting electrodes 402 of the first stage should be some distance aN2 greater that aN1, the actual distance depending of the specific voltage applied to the corona discharge electrodes. In any case, aN2 should be just greater than aN1, i.e., be within a range of 1 to 2 times distance aN1 and, more preferably, 1.1 to 1.65 times aN1 and even more preferably approximately 1.4 times aN1. In particular, as depicted in FIG. 4A, distance aN2 should be just greater than necessary to avoid a voltage between the corona onset voltage creating a current flow therebetween. Let us assume that this normalized "stant" distance aN2 is equal to 1.4×aN1. Then the horizontal distance 412 between neighboring stages is less than distance aN2 (413). As shown, intra-stage spacing is minimized when the same type of the electrodes of the neighboring stages are located in one plane 420 (as shown in FIG. 4A). Plane 420 may be defined as a plane orthogonal to the plane containing the edges of the corona discharge electrodes (plane 417 which is also substantially orthogonal to an airflow direction as shown in FIG. 4A). If the same type electrodes of neighboring states are located in different but parallel planes, such as planes 421 and 422 (as shown in FIG. 4B), the resultant minimal spacing distance between electrodes of adjacent EFA stages is equal to aN2 as shown by line 419. Note that the length of line 419 is the same as distance 413 (aN2) and is greater than distance 412 so that inter-stage spacing is increased.

Figure 5:
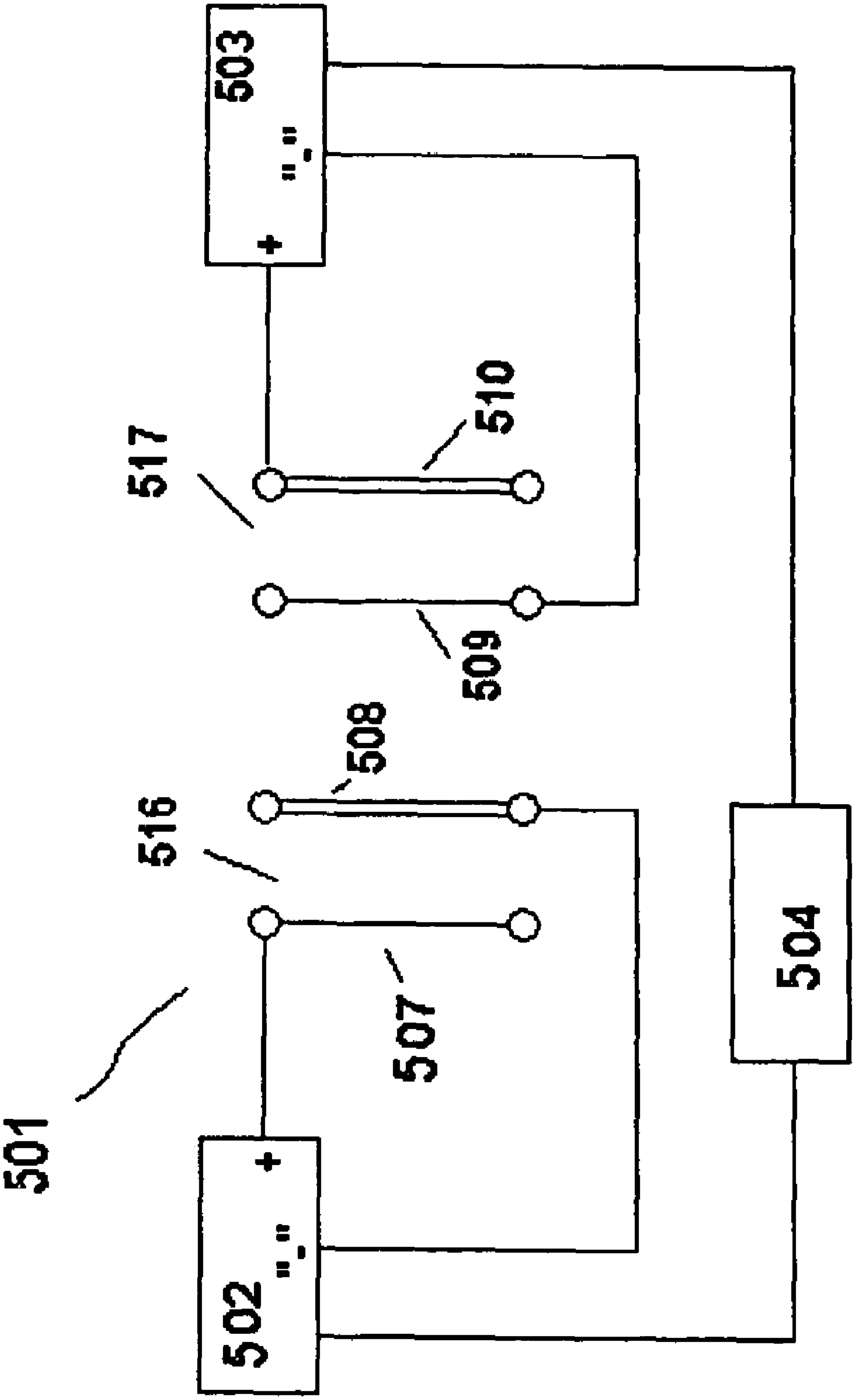
FIG. 5 is a schematic diagram of an EFA assemblies with a pairs of synchronized power supplies feeding respective adjacent corona discharge stages where closest electrodes have same or close electrical potentials.

FIG. 5 shows a configuration of an EFA 501 including a pair of EFA stages 516 and 517 powered by separate power supplies 502 and 503, respectively. First EFA stage 516 includes corona discharge electrode 507 and collecting electrode 508 forming a pair of complementary electrodes within stage 516. Second EFA stage 517 includes corona discharge electrode 509 and collecting electrode 510 forming a second pair of complementary electrodes. Both EFA stages 516, 517 and all electrodes 507-510 are shown schematically. According to one implementation, EFA stages 516 and 517 are arranged in tandem, with stage 517 arranged immediately subsequent to stage 516 in a desired airflow direction. A trailing edge of collecting electrode 508 (or trailing edge of an array of collecting electrodes) is spaced apart from a leading edge of corona discharge electrode 509 (or leading edge of an array of corona discharge electrodes) by a distance of between 1 and 10 cm depending on, among other factors, operating voltages.

First EFA stage 516 is powered by power supply 502 and an immediately subsequent (or next in an airflow direction) second EFA stage 517 is powered by power supply 503 with inversed polarity. That is, while corona discharge electrode 507 is supplied with a "positive" voltage with respect to collecting electrode 508, corona discharge electrode 509 of second EFA stage 517 is supplied with a "negative" voltage (i.e., for a time varying signal such as a.c., a voltage that is syn-phased with that supplied to collecting electrode 508 and opposite or out of phase with corona discharge electrode 507). In contrast, collecting electrode 510 is supplied with a "positive" voltage, i.e., one that is syn-phased with that supplied to corona discharge electrode 507. (Note that the phrases "positive voltage" and "negative voltage" are intended to be relative designations of either of two power supply terminals and not absolute.)

It is important that electrical voltage potentials of the electrodes 508 and 509 are the same or close to each other at any particular instant. Both EFA stages as well as both power supplies 502 and 503 may be of the same design to simplify synchronization, although different designs may be used as appropriate to accommodate alternative arrangements. Power supplies 502 and 503 are synchronized by the control circuitry 504 to provide synchronized power outputs. Control circuitry ensures that both power supplies 502 and 503 generate synchronized and syn-phased output voltages that are substantially equal such that the potential difference between the electrodes 508 and 509 is maintained substantially constant (e.g., has a zero or very small a.c. voltage component preferably less than 100 v rms and, more preferably, less than 10 v rms). Maintaining this potential difference constant (i.e., minimizing or eliminating any a.c. voltage component) limits or eliminates any capacitive current flow between electrodes 508 and 509 to an acceptable value, e.g., typically less than 1 mA and preferably less than 100 μA. That is, since $$I_c = C*[d(V1-V2)/dt]$$

and since $$\frac{dV}{dt} = V_1\sin\theta - V_2\sin(\theta+\phi)$$

(where ϕ is the phase difference between signals)

we can minimize Ic by a combination of minimizing any potential difference $(V_1-V_2)$ and the phase differential ϕ between the signals. For example, while V1 and V2 should be within 100 volts of each other and, more preferably, 10 volts, and should be syn-phases such that any phase differential should be maintained within 5 degrees and, more preferably, within 2 degrees and even more preferably within 1 degree.

Figure 6:
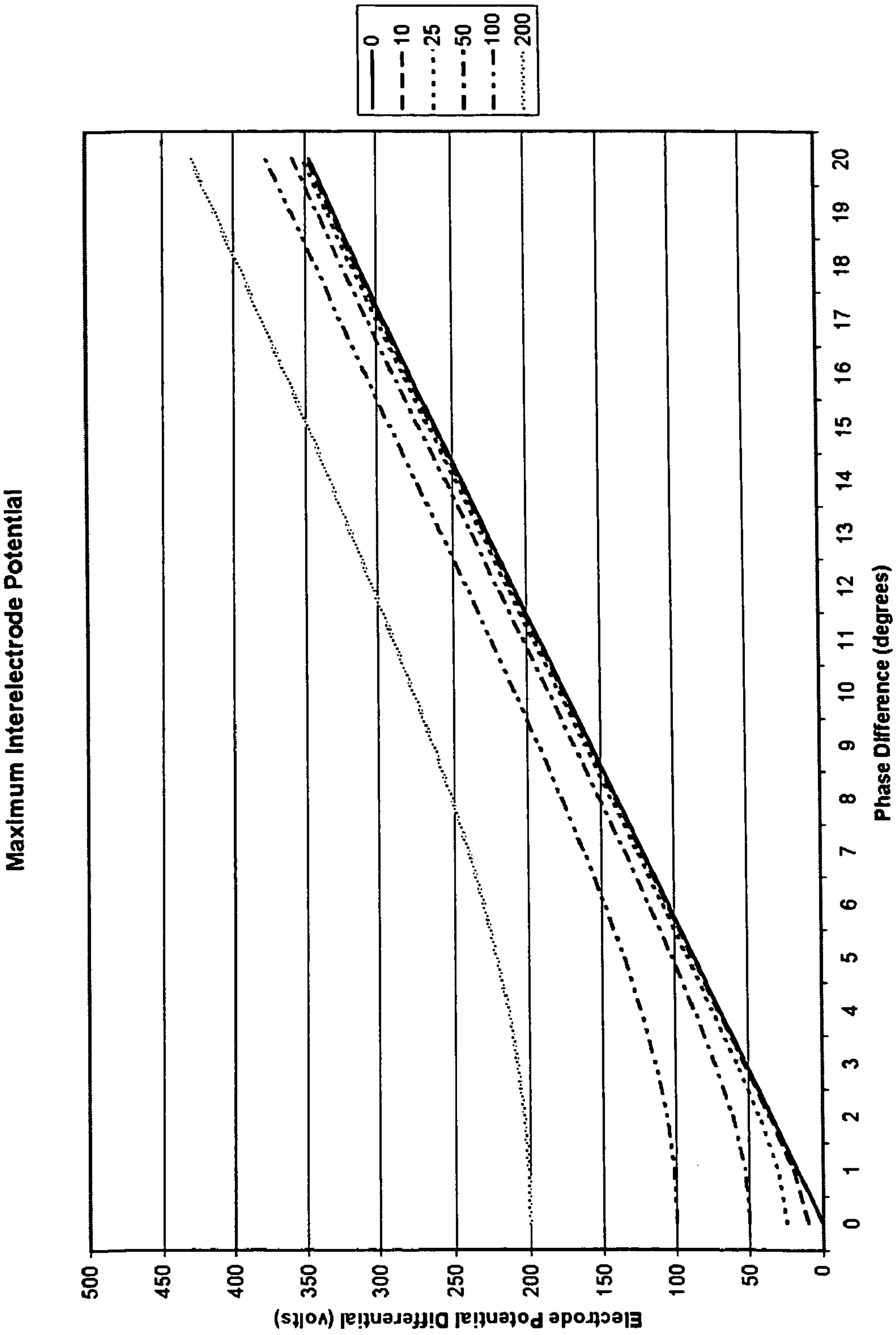
FIG. 6 is a graph showing the maximum instantaneous potential difference in volts between two electrodes supplied with signals of some constant potential difference as the phase difference between signals varies between 0 and 20 degrees.
Figure 6A:
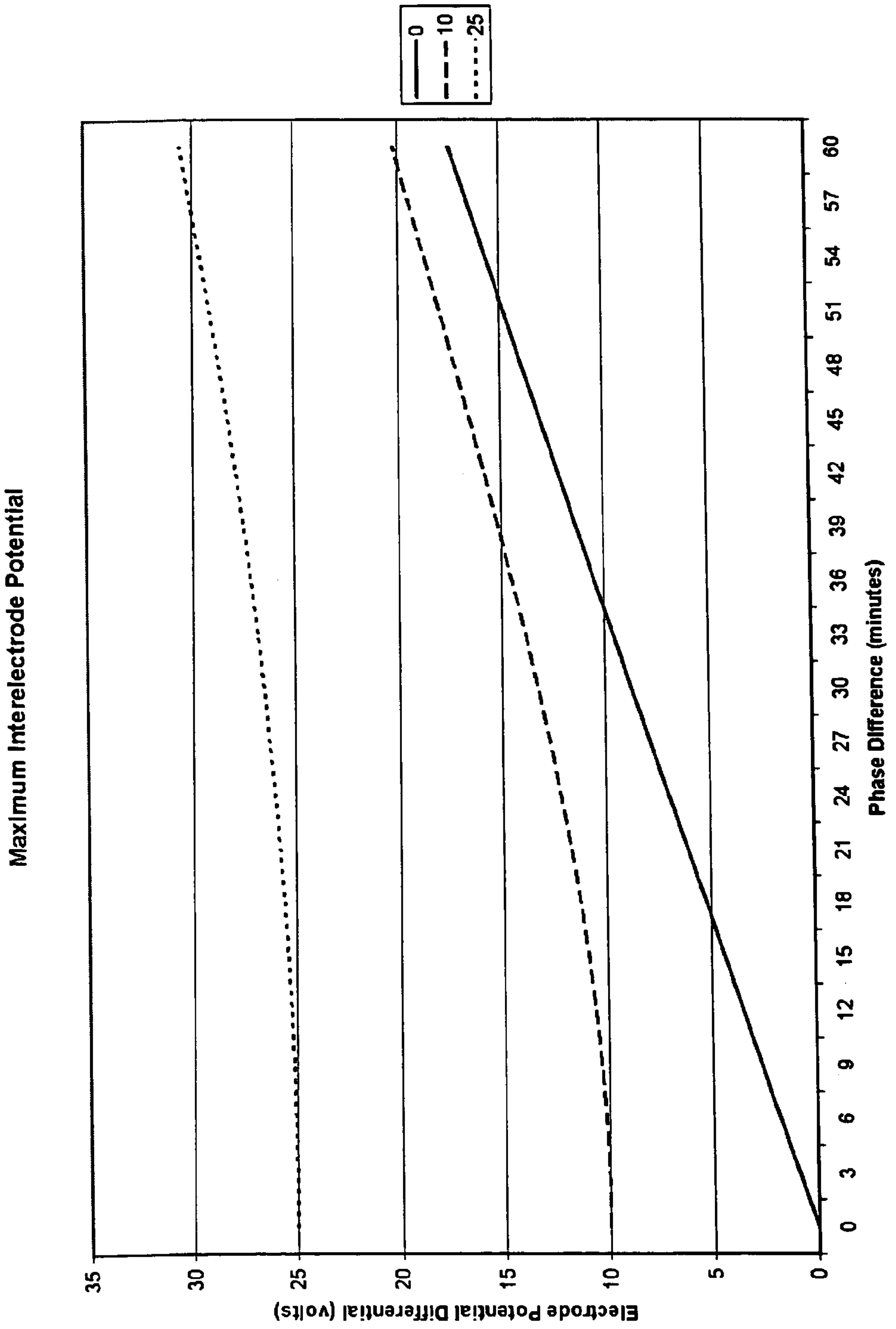
FIG. 6A is a graph showing the maximum instantaneous potential difference in volts between two electrodes supplied with signals of some constant potential difference as the phase difference between signals varies between 0 and 1 degree.

FIGS. 6 and 6A are graphs showing the maximum instantaneous potential difference in volts between two electrodes supplied with signals of some constant potential difference (in this case, one electrode maintained at 1000 volts rms, the other at 1000 plus 0, 10, 25, 50, 100 and 200 volts) as the phase difference between signals varies between 0 and 20 degrees (FIG. 6), with detail of changes occurring between zero and one degree phase difference shown in FIG. 6A. As shown, at such high voltages, even a small phase difference results in a substantial maximum instantaneous voltage level being created between the electrodes. The maximum instantaneous potential differential occurs at zero degrees plus one-half of the phase difference (i.e., $\phi/2$) and again 180 degree later (i.e., $180°+\phi/2$) in an opposite direction of polarity.

It should be noted that the polarity of the corona electrode of the different stages with regard to the corresponding collecting electrode may be the same (i.e. positive) or alternating (say, positive at the first stage, negative at the second stage, positive at the third and so forth).

In summary, embodiments of the invention incorporate architectures satisfying one or more of three conditions in various combinations:

1. Electrodes of the neighboring EFA stages are powered with substantially the same voltage waveform, i.e., the potentials on the neighboring electrodes should have substantially same alternating components. Those alternating components should be close or identical in both magnitude and phase.

2. Neighboring EFA stages should be closely spaced, spacing between neighboring stages limited and determined by that distance which is just sufficient to avoid or minimize any corona discharge between the electrodes of the neighboring stages.

3. Same type electrodes of neighboring stages should be located in the same plane that is orthogonal to the plane at which the electrodes (or electrodes leading edges) are located.

It should be noted and understood that all publications, patents and patent applications mentioned in this specification are indicative of the level of skill in the art to which the invention pertains. All publications, patents and patent applications are herein incorporated by reference to the same extent as if each individual publication, patent or patent application was specifically and individually indicated to be incorporated by reference in its entirety.

The invention claimed is:

1. A method of accelerating a fluid including the steps of:

synchronizing independent first and second high frequency power signals to a common frequency and phase; and powering first and second adjacent arrays of corona discharge and accelerating electrodes with respective ones of said first and second high voltage signals while maintaining said high voltage signals at substantially equal syn-phased operating voltages.

2. The method according to claim 1 further comprising a step of transforming a primary power signal into independent first and second voltages respectively including said independent first and second high frequency power signals, said step of transforming includes steps of increasing a voltage of said primary power signal to provide first and second high voltage alternating secondary power signals and independently rectifying said first and second high voltage alternating secondary power signals to provide said first and second high frequency power signals.

3. A method for providing an electrostatic fluid accelerator, said method comprising:

determining an intra-stage spacing to facilitate a corona onset voltage between corona discharge electrodes and accelerating electrodes of an electrostatic fluid accelerator while minimizing sparking between said corona discharge electrodes and said accelerating electrodes;

determining an inter-stage spacing to prevent a back corona forming between accelerating electrodes of a first electrostatic accelerator stage and corona discharge electrodes of a second electrostatic accelerator stage;

disposing said accelerating electrodes of said first electrostatic accelerator stage in a first plane;

disposing said corona discharge electrodes of said second electrostatic accelerator stage in a second plane, wherein said first and second planes are parallel, and wherein a spacing between said first and second planes is less than said inter-stage spacing; and powering said first electrostatic accelerator stage and said second electrostatic accelerator stage with a substantially equi-potential synchronized high voltage waveform.

4. The method of 3, wherein said step of disposing said corona discharge electrodes of said second electrostatic accelerator stage in said second plane comprises:

disposing said corona discharge electrodes substantially parallel to and in an offset configuration with said accelerating electrodes.

5. The method of 3, further comprising:

disposing corona discharge electrodes of said first electrostatic accelerator stage in a third plane, wherein said first, second, and third planes are substantially parallel, and wherein a spacing between said first and third planes is less than said intra-stage spacing.

6. The method of 5, wherein said step of disposing said corona discharge electrodes of said first electrostatic accelerator stage in said third plane comprises:

disposing said corona discharge electrodes of said first electrostatic accelerator stage parallel to and in-line with said corona discharge electrodes of said second electrostatic accelerator stage and substantially parallel to and in an offset configuration with said accelerating electrodes of said first electrostatic accelerator stage.

7. The method of 3, further comprising:

providing said first electrostatic accelerator stage having a first array of corona discharge electrodes and a first array of accelerating electrodes comprising said accelerating electrodes of said first electrostatic accelerator stage, wherein said providing said first electrostatic accelerator stage includes spacing each corona discharge electrode of said first array of corona discharge electrodes apart from said accelerating electrodes of said first array of accelerating electrodes said intra-stage spacing;

providing a second electrostatic accelerator stage having a second array of accelerating electrodes and a second array of corona discharge electrodes comprising said corona discharge electrodes of said second electrostatic accelerator stage, wherein said providing said second electrostatic accelerator stage includes spacing each corona discharge electrode of said second array of corona discharge electrodes apart from said accelerating electrodes of said second array of accelerating electrodes said intra-stage spacing.

8. The method of 7, further comprising:

exciting said first electrostatic accelerator stage and said second electrostatic accelerator stage with a synchronized high voltage waveform.

9. The method of 8, further comprising:

syn-phasing said high voltage waveform such that a potential difference between said first array of electrodes and said second array of electrodes is maintained substantially constant.

10. A method of operating an electrostatic fluid accelerator comprising the steps of:

supplying a high voltage power at a particular output voltage and current, said voltage and current waveforms each including constant and alternating components;

arranging a plurality of stages of electrodes in tandem, each stage of electrodes including at least one corona discharge electrode and at least one complementary electrode;

supplying said high voltage power to each of said stages of electrodes with substantially identical waveforms of said alternating component of said output voltage;

maintaining adjacent ones of said stages of electrodes at substantially equal syn-phased operating voltages; and sequentially accelerating a fluid passing through said stages of electrodes.

11. The method according to claim 10 wherein said step of maintaining adjacent ones of said stages of electrodes at substantially equal syn-phased operating voltages includes maintaining a complementary electrode of one stage and a corona discharge electrode of an immediately subsequent stage within 100 volts rms of each other.

12. The method according to claim 10 wherein said step of maintaining adjacent ones of said stages of electrodes at substantially equal syn-phased operating voltages includes maintaining a complementary electrode of one stage and a corona discharge electrode of an immediately subsequent stage within 10 volts rms of each other.

13. The method according to claim 10 wherein said step of maintaining adjacent ones of said stages of electrodes at substantially equal syn-phased operating voltages includes maintaining a current flow between said adjacent stages to a value of less than 1 mA.

14. The method according to claim 10 wherein said step of maintaining adjacent ones of said stages of electrodes at substantially equal syn-phased operating voltages includes maintaining a current flow between said adjacent stages to a value of less than 100 μA.

15. The method according to claim 10 wherein said step of supply said high voltage power to each of said stages of electrodes includes supplying said high voltage to each of said plurality of stages of electrodes substantially in phase and with substantially equal levels of said alternating component of said output voltage.

16. The method according to claim 10 wherein said step of supply said high voltage power to each of said stages of electrodes includes supplying said high voltage to each of said plurality of stages of electrodes substantially in phase and with substantially equal levels of said alternating component of said output currents.

17. The method according to claim 10 wherein said step of supply said high voltage power at a particular voltage and current includes:

transforming a primary power to said high voltage power to provide separate high voltage outputs; and synchronizing alternating components of said separate high voltage outputs produced by said transforming step.

18. The method according to claim 17 wherein said step of transforming said primary power to said high voltage power includes steps of transforming a voltage of said primary power to a voltage of said high voltage power and rectifying said high voltage power.

19. The method according to claim 10 wherein said alternating component of said output voltage has a frequency range within 50 Hz to 1000 kHz, said step of supply said high voltage power to each of said stages of electrodes including supplying said corona discharge electrodes of each of said stages with said alternating voltage component in phase and with substantially equal amplitude.

20. The method according to claim 10 wherein said alternating component of said output voltage has a frequency range within 50 Hz to 1000 kHz, said step of supply said high voltage power to each of said stages of electrodes including supplying said corona discharge electrodes of each of said stages with said alternating current component in phase with each other and with substantially equal amplitudes.

21. The method according to claim 10 wherein each of said stages of said electrodes comprises a first regular array of corona discharge electrodes and a second regular array of accelerating electrodes, said corona discharge electrodes and accelerating electrodes oriented substantially parallel to each other and each of said arrays of corona discharge electrodes spaced from each of said arrays of said accelerating electrodes of the same stage, corresponding ones of said electrodes of different ones of said stages being parallel to each other and to the electrodes of a nearest stage.

22. The method according to claim 21 wherein further comprising a step of spacing apart said corona discharge electrodes and accelerating electrodes of respective immediately adjacent ones of said stages a distance d that is 1 to 2 times greater than a closest distance between ones of said corona discharge electrodes and immediately adjacent ones of the electrodes of each of said stages.

23. The method according to claim 10 wherein each of said stages of electrodes includes a plurality of corona discharge electrodes located in a common transverse plane, each of said transverse planes being substantially orthogonal to an airflow direction and ones of said corona discharge electrodes of neighboring ones of said stages located in respective common planes orthogonal to said transverse planes.

24. The method according to claim 10 wherein each of said stages of electrodes includes a plurality of parallel corona discharge wires positioned in a first plane and a plurality of parallel accelerating electrodes having edges closest to the corona discharge electrodes aligned in respective second plane, said first and second planes substantially parallel to each other and substantially perpendicular to a common average airflow direction through said stages.

25. A method of operating an electrostatic fluid accelerator comprising the steps of:

independently supplying a plurality of electrical output power signals substantially in phase with each other;

supplying a plurality of stages of an electrostatic fluid air accelerator unit with a respective one of said plurality of electrical output power signals, each of said stages including a first array of corona discharge electrodes and a second array of attractor electrodes spaced apart from said first array along an airflow direction, each of said stages connected to a respective one of said output circuits for supplying a corresponding one of said electrical output power signals to said corona discharge and attractor electrodes of said first and second arrays, and maintaining said second array of attractor electrodes of one of said stages and said first array of corona discharge electrodes of an immediately subsequent one of said stages at substantially equal syn-phased operating voltages.

26. The method according to claim 25 wherein said step of maintaining includes maintaining said attractor electrodes of said one stage and said corona discharge electrodes of said immediately subsequent stage at syn-phased operating voltages within 100 volts rms of each other.

27. The method according to claim 25 wherein said step of maintaining includes maintaining said attractor electrodes of said one stage and said corona discharge electrodes of said immediately subsequent stage at syn-phased operating voltages within 10 volts rms of each other.

28. The method according to claim 25 wherein said step of maintaining includes maintaining said attractor electrodes of said one stage and said corona discharge electrodes of said immediately subsequent stage at syn-phased operating voltages such that a current flow therebetween is less than 1 mA.

29. The method according to claim 25 wherein said step of maintaining includes maintaining said attractor electrodes of said one stage and said corona discharge electrodes of said immediately subsequent stage at syn-phased operating voltages such that a current flow therebetween is less than 100 μA.

30. The method according to claim 25 wherein said step of independently supplying a plurality of electrical output power signals substantially in phase with each other includes transforming a primary power source voltage to a high voltage, rectifying said high voltage high voltage power source to obtain a high voltage direct current, and synchronizing said high voltage direct current of each of a plurality of electrical power signals to provide said electrical output power signals.

31. The method according to claim 25 wherein each of said electrical output power signals has an a.c. component having a fundamental operating frequency within a range of 50 Hz to 1000 kHz.

32. A method of constructing an electrostatic fluid accelerator comprising the steps of:

orienting a first array of corona discharge electrodes disposed in a first plane;

orienting a second array of corona discharge electrodes in a second plane, said second plane being parallel to and spaced apart from said first plane;

orienting a third array of accelerating electrodes in a third plane, parallel to said first and second planes and disposed therebetween, wherein each accelerating electrode of said third array is disposed in a staggered configuration with respect to said corona discharge electrodes of said first array; and maintaining said third array of accelerating electrodes at a substantially equal syn-phased operating voltage with said second array of corona electrodes.

33. The method according to claim 32 including a step of maintaining said second and third arrays at syn-phased operating voltages within 100 volts rms of each other.

34. The method according to claim 32 including a step of maintaining said second and third arrays at syn-phased operating voltages within 10 volts rms of each other.

35. The method according to claim 32 including a step of maintaining said second and third arrays at syn-phased operating voltages such that a current flow therebetween is less than 1 mA.

36. The method according to claim 32 including a step of maintaining said second and third arrays at syn-phased operating voltages such that a current flow therebetween is less than 100 μA.

37. The method according to claim 32 including staggering each accelerating electrode of said third array with respect to said corona discharge electrodes of said second array.

38. The method according to claim 32 including aligning said corona discharge electrodes of said first array with said corona discharge electrodes of said second array.

39. The method according to claim 32, including a step of spacing each corona discharge electrode of said second array from a nearest accelerator electrode of said third array to achieve a spacing that is within the range of 1.2 to 2 times a spacing between each corona discharge electrode of said first array and a nearest accelerator electrode of said third array.

40. The method according to claim 32, including a step of spacing each corona discharge electrode of said second array from a nearest accelerator electrode of said third array to achieve a spacing that is within the range of 1.2 to 1.65 times a spacing between each corona discharge electrode of said first array and a nearest accelerator electrode of said third array.

41. The method according to claim 32, including a step of spacing each corona discharge electrode of said second array from a nearest accelerator electrode of said third array to achieve a spacing that is approximately 1.4 times a spacing between each corona discharge electrode of said first array and a nearest accelerator electrode of said third array.

42. The method according to claim 32, further comprising the steps of:

longitudinally orienting a fourth array of accelerating electrodes in a fourth plane, said fourth plane being parallel to said first, second, and third planes and disposed on an opposite side of said second array than is said third plane; and disposing each accelerating electrode of said fourth array in a staggered orientation with respect to said corona discharge electrodes of said second array.

43. The method according to claim 32, further comprising the step of:

coupling a high voltage power supply circuit to said first and third arrays;

providing a high voltage waveform to corona discharge electrodes of said first array; and synchronizing said high voltage waveform provided to said corona discharge electrodes of said first array with a high voltage waveform provided to corona discharge electrodes of said second array.

44. The method according to claim 43, further comprising the steps of:

coupling a first high voltage power supply to said first array;

coupling a second high voltage power supply to said second array; and controlling each of said high voltage power supplies to generate synchronized and syn-phased high voltage waveforms.

45. A method of constructing an electrostatic fluid accelerator system having a plurality of closely spaced electrostatic accelerator stages, said method comprising the steps of:

disposing a first array of corona discharge electrodes of a first electrostatic accelerator stage in a first plane;

disposing a first array of accelerating electrodes of said first electrostatic accelerator stage in a second plane;

disposing a second array of corona discharge electrodes of a second electrostatic accelerator stage in a third plane;

disposing a second array of accelerating electrodes of said second electrostatic accelerator stage in a fourth plane, disposing each corona discharge electrode of said second array of corona discharge electrodes offset from each accelerating electrode of said first array of accelerating electrodes; and maintaining each corona discharge electrode of said second array of corona discharge electrodes at a substantially equal syn-phased voltage with said first array of accelerating electrodes.

46. The method according to claim 45 including a step of orienting said first, second, third, and fourth planes substantially parallel to each other.

47. The method according to claim 45 including a step of providing a high voltage waveform to said first array of corona discharge electrodes synchronized with a high voltage waveform provided to said second array of corona discharge electrodes.

48. The method according to claim 47 including a step of providing said high voltage waveform to said first array of corona discharge electrodes syn-phased with said high voltage waveform provided to said second array of corona discharge electrodes.

49. The method according to claim 45 including the steps of:

coupling a first high voltage power supply to said first array of corona discharge electrodes;

coupling a second high voltage power supply to said second array of corona discharge electrodes; and controlling said first and second high voltage power supplies to generate synchronized high voltage waveforms.

50. The method according to claim 45 including the step of disposing each accelerating electrode of said first array of accelerating electrodes offset from each corona discharge electrode of said first array of corona discharge electrodes.

51. The method according to claim 50 including the step of disposing each accelerating electrode of said second array of accelerating electrodes offset from each corona discharge electrode of said second array of corona discharge electrodes.

52. The method according to claim 50 including the step of aligning corona discharge electrodes of said first array of corona discharge electrodes with corona discharge electrodes of said second array of corona discharge electrodes.

53. The method according to claim 50 including a step of spacing said corona discharge electrode of said first array of corona discharge electrodes from said accelerating electrodes of said first array of accelerating electrodes by a first distance that is greater than an intra-stage electrode spacing as measured along a line normal to each first and second planes.

54. The method according to claim 53 including a step of spacing each corona discharge electrode of said second array of corona discharge electrodes from said accelerating electrodes of said first array of accelerating electrodes by a second distance, said second distance being greater than an inter-stage electrode spacing as measured along a line normal to each said second and third planes, said second distance being greater than said first distance.

55. The method according to claim 54 wherein said second distance is in the range of 1.2 to 2 times said first distance.

56. The method according to claim 54 wherein said first distance is selected as a function of a corona onset voltage between said corona discharge electrodes of said first array of corona discharge electrodes and said accelerating electrodes of said first array of accelerating electrodes.

57. The method according to claim 54 wherein said second distance is selected to prevent a back corona between said second electrostatic accelerator stage and said first electrostatic accelerator stage.

* * * * *